US012707482B2

(12) United States Patent
Liu

(10) Patent No.: US 12,707,482 B2
(45) Date of Patent: Aug. 11, 2026

(54) METHOD AND APPARATUS FOR RECEIVING MULTICAST SERVICE, METHOD AND APPARATUS FOR RECEIVING AND CONFIGURING MULTICAST SERVICE, TERMINAL, AND NETWORK SIDE DEVICE

(71) Applicant: VIVO MOBILE COMMUNICATION CO., LTD., Guangdong (CN)

(72) Inventor: Jiamin Liu, Guangdong (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 296 days.

(21) Appl. No.: 18/402,266

(22) Filed: Jan. 2, 2024

(65) Prior Publication Data

US 2024/0137955 A1 Apr. 25, 2024
US 2024/0237032 A9 Jul. 11, 2024

Related U.S. Application Data

(63) Continuation of application No. PCT/CN2022/101466, filed on Jun. 27, 2022.

(30) Foreign Application Priority Data

Jul. 2, 2021 (CN) ......................... 202110751465.0

(51) Int. Cl.
*H04W 72/20* (2023.01)
*H04W 4/06* (2009.01)
(Continued)

(52) U.S. Cl.
CPC ............. *H04W 72/30* (2023.01); *H04W 4/06* (2013.01); *H04W 4/12* (2013.01); *H04W 72/20* (2023.01)

(58) Field of Classification Search
CPC ........ H04L 12/189; H04W 4/06; H04W 4/12; H04W 72/20; H04W 72/30; H04W 76/27; H04W 76/40
See application file for complete search history.

(56) References Cited

U.S. PATENT DOCUMENTS

2022/0248184 A1 8/2022 Li et al.
2023/0247401 A1* 8/2023 Yu ......................... H04W 72/20 455/414.1
2023/0319942 A1* 10/2023 Yu ........................... H04W 4/06 370/329

FOREIGN PATENT DOCUMENTS

WO 2021077434 A1 4/2021
WO WO-2021120018 A1 * 6/2021 ............ H04W 72/04

OTHER PUBLICATIONS

Ericsson, "Open issues for UEs in idle or inactive mode", 3GPP TSG-RAN2 Meeting #113bis-e, R2-2103776, Apr. 12-20, 2021, eMeeting.

(Continued)

*Primary Examiner* — Phuc H Tran
(74) *Attorney, Agent, or Firm* — Foley & Lardner LLP

(57) ABSTRACT

This application belongs to the field of communication technologies, and discloses a method and an apparatus for receiving a multicast service, a method and an apparatus for receiving and configuring a multicast service, a terminal, and a network side device. The method for receiving and configuring a multicast service in embodiments of this application includes: sending, by the network side device, notification information to the terminal, where the notification information is used to indicate one of the following: the terminal remains in a current state to receive a first multicast service; and the terminal is released from a connected state to a non-connected state to receive the first multicast service.

20 Claims, 4 Drawing Sheets

(51) Int. Cl.
*H04W 4/12* (2009.01)
*H04W 72/30* (2023.01)

(56) References Cited

OTHER PUBLICATIONS

Intel Corporation, "Group notification and RACH congestion", 3GPP TSG-RAN WG2 Meeting #114-e, R2-2104875, May 19-27, 2021, Electronic meeting.

* cited by examiner

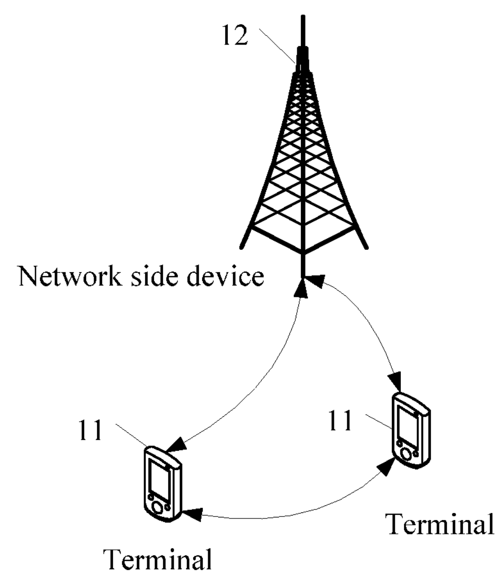
FIG. 1
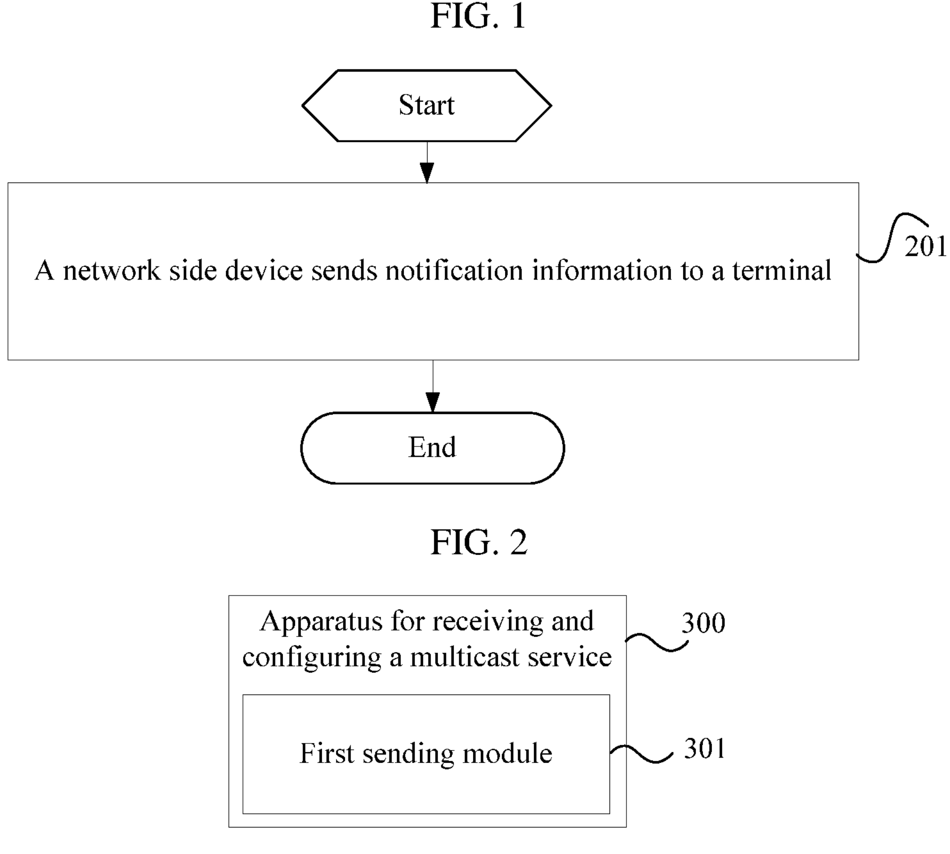
FIG. 2
FIG. 3

METHOD AND APPARATUS FOR RECEIVING MULTICAST SERVICE, METHOD AND APPARATUS FOR RECEIVING AND CONFIGURING MULTICAST SERVICE, TERMINAL, AND NETWORK SIDE DEVICE

CROSS-REFERENCE TO RELATED APPLICATIONS

This application is a continuation application of PCT Application No. PCT/CN2022/101466 filed on Jun. 27, 2022, which claims priority to Chinese Patent Application No. 202110751465.0 filed in China on Jul. 2, 2021, disclosures of which are included herein in their entireties.

TECHNICAL FIELD

This application belongs to the communications field, and in particular, to a method and an apparatus for receiving a multicast service, a method and an apparatus for receiving and configuring a multicast service, a terminal, and a network side device.

BACKGROUND

In related technologies, new radio (NR) broadcast and multicast services are respectively received in different manners. For the broadcast service, a delivery mode 2 is used, that is, to enable user equipment (UE, also referred to as a terminal) in an idle/inactive/connected state to perform receiving, all broadcast-related configuration information and service data are sent in a broadcast manner. However, the multicast service is sent in a delivery mode 1, that is, only connected UE can obtain, by using dedicated radio resource control (RRC) signaling, configuration information related to the multicast service, to receive service data.

In the foregoing delivery mode 1 for the multicast service, because all interested UEs are required to enter the connected state to obtain a configuration and receiving services, when there is a large quantity of UEs, system load is excessively heavy or a system is even overloaded, thereby affecting normal sending of other unicast and multicast services, which is not conducive to network efficiency and overall performance.

SUMMARY

According to a first aspect, a method for receiving and configuring a multicast service is provided, including:

sending, by a network side device, notification information to a terminal, where the notification information is used to indicate one of the following:

the terminal remains in a current state to receive a first multicast service; and the terminal is released from a connected state to a non-connected state to receive the first multicast service.

According to a second aspect, an apparatus for receiving and configuring a multicast service is provided, including:

a first sending module, configured to send notification information to a terminal, where the notification information is used to indicate one of the following:

the terminal remains in a current state to receive a first multicast service; and the terminal is released from a connected state to a non-connected state to receive the first multicast service.

According to a third aspect, a method for receiving a multicast service is provided, including:

receiving, by a terminal, notification information sent by a network side device;

determining configuration information of a first multicast service based on the notification information; and receiving the first multicast service based on the configuration information, where the notification information is used to indicate one of the following:

the terminal remains in a current state to receive the first multicast service; and the terminal is released from a connected state to a non-connected state to receive the first multicast service.

According to a fourth aspect, an apparatus for receiving a multicast service is provided, including:

a first receiving module, configured to receive notification information sent by a network side device;

a determining module, configured to determine configuration information of a first multicast service based on the notification information; and a second receiving module, configured to receive the first multicast service based on the configuration information, where the notification information is used to indicate one of the following:

the terminal remains in a current state to receive the first multicast service; and the terminal is released from a connected state to a non-connected state to receive the first multicast service.

According to a fifth aspect, a terminal is provided, where the terminal includes a processor, a memory, and a program or an instruction stored in the memory and capable of running on the processor, and when the program or the instruction is executed by the processor, the steps of the method in the third aspect are implemented.

According to a sixth aspect, a terminal is provided, including a processor and a communication interface, where the communication interface is configured to receive notification information sent by a network side device;

the processor is configured to determine configuration information of a first multicast service based on the notification information; and the communication interface is configured to receive the first multicast service based on the configuration information, where the notification information is used to indicate one of the following:

the terminal remains in a current state to receive the first multicast service; and the terminal is released from a connected state to a non-connected state to receive the first multicast service.

According to a seventh aspect, a network side device is provided, where the network side device includes a processor, a memory, and a program or an instruction stored in the memory and capable of running on the processor, and when the program or the instruction is executed by the processor, the steps of the method in the first aspect are implemented.

According to an eighth aspect, a network side device is provided, including a processor and a communication interface, where the communication interface is configured to send notification information to a terminal, where the notification information is used to indicate one of the following:

the terminal remains in a current state to receive a first multicast service; and the terminal is released from a connected state to a non-connected state to receive the first multicast service.

According to a ninth aspect, a readable storage medium is provided, where the readable storage medium stores a program or an instruction, and when the program or the instruction is executed by a processor, the steps of the method in the first aspect or the steps of the method in the third aspect are implemented.

According to a tenth aspect, a chip is provided, where the chip includes a processor and a communication interface, the communication interface is coupled to the processor, and the processor is configured to run a program or an instruction to implement the steps of the method in the first aspect or the third aspect.

According to an eleventh aspect, a computer program/program product is provided, where the computer program/program product is stored in a non-transient storage medium, and the program/program product is executed by at least one processor to implement the steps of the method according to the first aspect or the third aspect.

BRIEF DESCRIPTION OF DRAWINGS

FIG. 1 is a block diagram of a wireless communication system to which embodiments of this application are applicable;

FIG. 2 is a schematic flowchart of a method for receiving and configuring a multicast service according to an embodiment of this application;

FIG. 3 is a schematic module diagram of an apparatus for receiving and configuring a multicast service according to an embodiment of this application;

DESCRIPTION OF EMBODIMENTS

Figure 4:
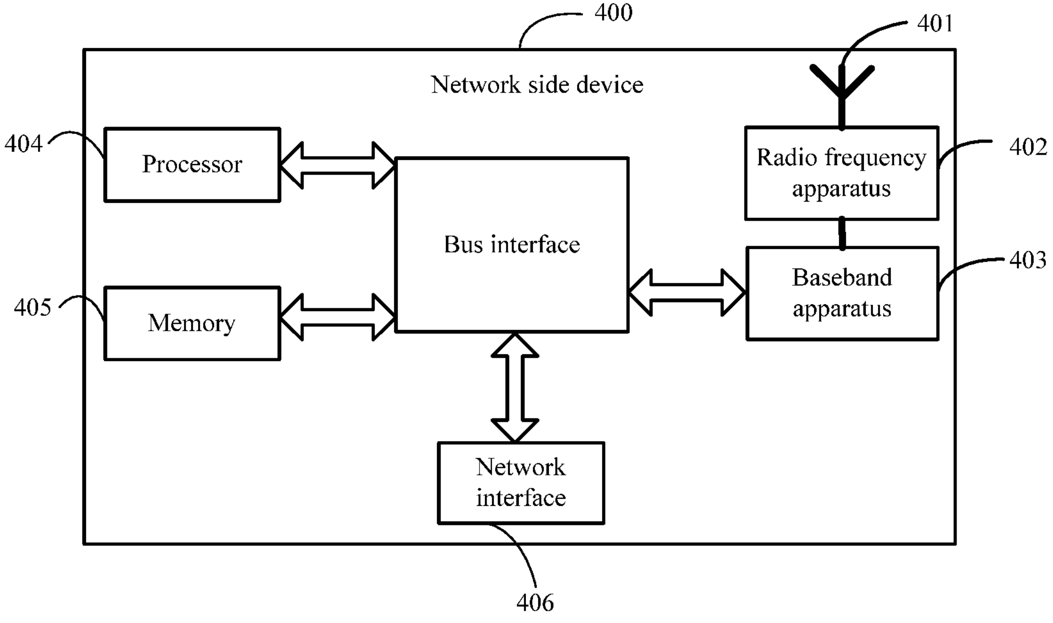
FIG. 4 is a structural block diagram of a network side device according to an embodiment of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first", "second", and the like are intended to distinguish between similar objects, but do not describe a specific order or sequence. It should be understood that, the terms used in such a way is interchangeable in proper circumstances, so that the embodiments of this application can be implemented in an order other than the order illustrated or described herein. Objects classified by "first" and "second" are usually of a same type, and the quantity of objects is not limited. For example, there may be one or more first objects. In addition, in the descriptions and the claims, "and/or" represents at least one of connected objects, and a character "/" generally represents an "or" relationship between associated objects.

It should be noted that technologies described in the embodiments of this application are not limited to a long term evolution (LTE)/LTE-advanced (LTE-A) system, and may also be used in other wireless communications systems such as code division multiple access (CDMA), time division multiple access (TDMA), frequency division multiple access (FDMA), orthogonal frequency division multiple access (OFDMA), single-carrier frequency-division multiple access (SC-FDMA), and another system. The terms "system" and "network" in the embodiments of this application may be used interchangeably. The technologies described can be applied to both the systems and the radio technologies mentioned above as well as to other systems and radio technologies. The following descriptions describe a new radio (NR) system for example purposes, and NR terms are used in most of the following descriptions. However, these technologies can also be applied to an application other than an NR system application, for example, a $6^{th}$ generation (6G) communications system.

FIG. 1 is a block diagram of a wireless communications system to which embodiments of this application are applicable. The wireless communications system includes a terminal 11 and a network side device 12. The terminal 11 may also be referred to as a terminal device or user equipment (UE). The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile internet device (MID), a wearable device or a vehicle user equipment (VUE), or pedestrian user equipment (PUE). The wearable device includes a smartwatch, a smart band, a headset, glasses, and the like. It should be noted that a specific type of the terminal 11 is not limited in the embodiments of this application. The network side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a home NodeB, a home evolved NodeB, a wireless local area network (WLAN) access point, a WiFi node, a transmission and reception point (TRP), or another appropriate term in the field. As long as a same technical effect is achieved, the base station is not limited to a specific technical term. It should be noted that only a base station in the NR system is used as an example in the embodiments of this application, but a specific type of the base station is not limited.

With reference to the accompanying drawings, a method and an apparatus for receiving a multicast service, a method and an apparatus for receiving and configuring a multicast service, a terminal, and a network side device provided in the embodiments of this application are described below in detail by using some embodiments and application scenarios of the embodiments.

As shown in FIG. 2, an embodiment of this application provides a method for receiving and configuring a multicast service, including the following steps.

Step 201: A network side device sends notification information to a terminal.

The notification information is used to indicate one of the following:

A11: The terminal remains in a current state to receive a first multicast service.

It should be noted that in this case, when the network side device notifies the terminal that the terminal can receive a multicast service without entering a connected state, the terminal may directly remain in the current state. The current state may be a state used when the terminal receives a multicast service activation notification or a state used before the terminal is about to receive the multicast service. The current state may be an idle state, an inactive state, or a connected state.

A12: The terminal is released from the connected state to a non-connected state to receive the first multicast service.

It should be noted that in this case, the terminal is initially in the connected state. When a multicast service needs to be received, the network side device releases the terminal from the connected state to the non-connected state, and then the terminal receives the multicast service in the non-connected state.

It should be noted that the non-connected state mentioned in this embodiment of this application refers to the idle state or the inactive state.

It should be noted that the first multicast service mentioned in this embodiment of this application is any multicast service or any group of multicast services, or may be all multicast services sent in a same cell.

It should be noted that in this case, the network side device may first determine whether the terminal needs to enter the connected state to receive the first multicast service. When determining that the terminal does not need to enter the connected state to receive the first multicast service, the network side device sends the notification information to the terminal.

Optionally, a specific implementation for the network side device to determine whether the terminal needs to enter the connected state to receive the first multicast service includes at least one of the following:

B11: When a quality of service (QoS) feature of the first multicast service meets a first feature threshold requirement, determine that the terminal does not need to enter the connected state to receive the first multicast service.

It should be noted that a QoS feature requirement is mainly determined in this case. When the QoS feature requirement is not high, it may be directly determined that the terminal does not need to enter the connected state to receive the first multicast service. The feature threshold requirement that is met by the QoS feature herein may be that a block error rate requirement is higher than or not less than a block error rate threshold. For example, the block error rate threshold is $10^{-3}$, which is a most common QoS requirement for an unacknowledgement mode (UM) service. In this case, a common control channel and an UM packet transfer mode (PTM) transmission may meet a service need.

B12: When load of a network is greater than or equal to a first threshold, determine that the terminal does not need to enter the connected state to receive the first multicast service.

It should be noted that the load of the network is mainly determined in this case. When the load of the network is greater than or equal to the first threshold, it indicates that the load on a network side is relatively high and no more terminals can be accommodated to enter the connected state to receive a multicast service. In this case, it can be directly determined that some terminals do not need to enter the connected state to receive the first multicast service.

B13: When load of a network is greater than or equal to a second threshold and a priority of the first multicast service is greater than or equal to a first priority threshold, determine that the terminal does not need to receive the first multicast service.

It should be noted that the load of the network and the priority of the service are mainly determined in this case. When the load of the network is greater than or equal to the second threshold, it indicates that the load on a network side is relatively high and no more terminals can be accommodated to enter the connected state to receive a multicast service. In addition, when the priority of the service is relatively low, the network side device may directly release the service, that is, notify the terminal that the terminal no longer needs to receive the multicast service.

It should be noted that, usually, a lower priority value indicates a higher priority. For example, a priority value is defined from 1 to 8, 1 represents a highest priority, and 8 represents a lowest priority. In other words, that the priority of the first multicast service is greater than or equal to the first priority threshold means: A priority identifier value (that is, a priority value) of the first multicast service is greater than or equal to an identifier value indicated by the first priority threshold.

B14: When load of a network is greater than or equal to a third threshold and a priority of the first multicast service is greater than or equal to a second priority threshold, determine that the terminal needs to receive the first multicast service in the non-connected state.

It should be noted that the load of the network and the priority of the service are mainly determined in this case. When the load of the network is greater than or equal to a third threshold, it indicates that the load on a network side is relatively high and no more terminals can be accommodated to enter the connected state to receive a multicast service. When the priority of the service is relatively low, it may be determined that the terminal needs to receive the first multicast service in the non-connected state, that is, the network side device needs to release the service to the non-connected state for reception.

It should be noted that the priority of the first multicast service being greater than or equal to the second priority threshold means: A priority identifier value of the first multicast service is greater than or equal to an identifier value indicated by the second priority threshold.

B15: When load of a network is greater than or equal to a fourth threshold, and a QoS feature of the first multicast service meets a feature threshold requirement, determine that the terminal needs to receive the first multicast service in the non-connected state.

It should be noted that the load of the network and a QoS feature requirement are mainly determined in this case. When the load of the network is greater than or equal to the fourth threshold, it indicates that the load on a network side is relatively high and no more terminals can be accommodated to enter the connected state to receive a multicast service. In addition, when the QoS feature requirement is not high, it may be determined that the terminal needs to receive the first multicast service in the non-connected state, that is, the network side device needs to release the service to the non-connected state for reception.

Specific implementations of the network side device in two cases that are A11 and A12 are described below in detail.

1. The notification information is used to indicate that the terminal remains in the current state to receive the first multicast service.

It should be noted that an implementation that may be used and that is of step 201 is as follows:

The network side device sends target information to the terminal, where the target information carries the notification information.

The target information includes at least one of the following:

B21: Paging message.

It should be noted that, when the terminal receiving the notification information is in the idle state or the inactive state, because a multicast service activation notification is sent by using the paging message, the notification information may be directly sent in the paging message to the terminal in the idle state or the inactive state, and the paging message needs to carry a first multicast service activation notification. The first multicast service activation notification is used to indicate that the first multicast service is about to be activated.

B22: Multicast control channel (MCCH) change notification.

It should be noted that, when the terminal receiving the notification information is a terminal in the idle state or the inactive state, especially a terminal after R18, it may be extensionally required that the terminals also need to listen to the MCCH change notification even if the terminals are interested only in the multicast service. In this case, the notification information may be directly sent in the MCCH change notification to the terminal in the idle state or the inactive state, and the MCCH change notification needs to carry a first multicast service activation notification. The first multicast service activation notification is used to indicate that the first multicast service is about to be activated.

B23: First radio resource control (RRC) signaling.

It should be noted that, the first RRC signaling herein may be dedicated RRC signaling.

It should be noted herein that, when the terminal receiving the notification information is the terminal in the connected state, R17 does not need to listen to the paging message or the MCCH change notification to obtain multicast service activation information, but the network side device directly delivers, based on information about a terminal in which a core network node is interested, configuration information of a multicast service to the terminal by using the dedicated RRC signaling. Therefore, in this embodiment of this application, the configuration information may alternatively be delivered by using the dedicated RRC signaling. However, a more efficient manner is to inform, by using the dedicated RRC signaling, the terminal that a multicast service in which the terminal is interested is about to be activated. Therefore, the notification information may be carried in the dedicated RRC signaling to the terminal, and the dedicated RRC signaling needs to carry the first multicast service activation notification. After receiving the dedicated RRC signaling, the terminal obtains the configuration information of the multicast service from a corresponding common control channel.

It should be noted that, after the network side device notifies the terminal of the first multicast service activation notification, the terminal needs to be notified of the configuration information of the first multicast service. Optionally, the network side device sends the configuration information of the first multicast service to the terminal through the common control channel.

Correspondingly, when determining the configuration information, the terminal obtains the configuration information of the first multicast service by reading a first common control channel.

It should be noted that the first common control channel is a common control channel corresponding to a data packet or information read by the terminal at a moment that is after and closest to a moment at which the notification information is received.

Optionally, when sending the configuration information of the first multicast service, to ensure that the sent configuration information of the first multicast service can be obtained by the terminal, the network side device may first determine whether the terminal has a capability to receive the common control channel at a preset frequency.

When the terminal has the capability to receive the common control channel at the preset frequency, the configuration information of the first multicast service is sent to the terminal through the common control channel. When the terminal has no capability to receive the common control channel at the preset frequency, the configuration information of the first multicast service is sent to the terminal by using second RRC signaling.

That is, if some terminals in the connected state have no capability to receive the common control channel at the preset frequency (any one or more specified frequencies), the network side device may perform delivery by using the second RRC signaling (the second RRC signaling herein may be dedicated RRC signaling). A consensus about the capability is reached between the network and the terminal. The capability to receive the common control channel includes one of the following:

B31: a capability to receive the common control channel in a primary cell (PCell) or a primary secondary cell (PSCell); and in other words, it may be specified or defaulted that the terminal in the connected state receives the common control channel only in the PCell or the PSCell;

B32: a capability to receive the common control channel in any serving cell; and in other words, it may be specified or defaulted that the terminal in the connected state may receive the common control channel in any serving cell; and B33: a capability to receive the common control channel in any cell that can be configured as a serving cell; and in other words, it can be specified or defaulted that the terminal in the connected state may receive the common control channel in any cell that can be configured as the serving cell; and for example, although a cell 1 does not fall within a configuration range of a current serving cell, the cell 1 may be added to the terminal as a new serving cell based on a carrier aggregation capability of the terminal, and the terminal may receive the common control channel in the cell 1.

It should be noted that, for the capability to receive the common control channel, the terminal and the network side device notify, through capability negotiation or a signaling displaying process, each other of information about the capability to receive the common control channel.

Preferably, the common control channel in this embodiment of this application is an MCCH.

It should be specially noted herein that, for the terminal in the idle state or the inactive state, if the current terminal has enough capability to camp on a current cell, and then reads a public control message of a specified cell, the terminal camps on the current cell, reads the public control message of the specified cell and receive a multicast service. If the current terminal does not have enough capability to camp on a current cell and reads a public control message of a specified cell, the terminal needs to re-select another cell to be capable of reading the public control message of the specified cell. Most directly, the terminal may reselect a cell that sends the public control message, to perform reading and service reception.

2. The notification information is used to indicate that the terminal is released from the connected state to the non-connected state to receive the first multicast service.

Generally, when system load allows, the terminal preferentially enters the connected state to configure a multicast service and receive service data, and a receiving effect is optimum. However, as a quantity of terminals and a quantity of services increase, the system load gradually increases. In this case, a network side cannot accommodate all terminals or all services are received in the connected state. The network side may selectively release, based on a service priority and a user situation, some services of part of or some terminals to the idle/inactive state for reception.

It should be noted that an implementation that may be used and that is of step 201 is as follows:

The network side device sends fourth RRC signaling to the terminal, where the fourth RRC signaling carries the notification information.

Optionally, the fourth RRC signaling is dedicated RRC signaling, for example, may be RRC release signaling.

In this case, because the terminal initially receives a service in the connected state, the terminal obtains the configuration information of the multicast service by using the dedicated RRC signaling. Optionally, the network side device indicates, in a first manner for the terminal, the configuration information of the first multicast service used in the non-connected state.

The first manner includes one of the following:

C11: A first indication sent when the network side device releases the terminal, where the first indication is used to indicate availability that is of first configuration information and that exists when the terminal is in the non-connected state, and the first configuration information is configuration information used when the terminal performs the first multicast service in the connected state.

It should be noted that, this case refers to that when releasing a user, the network side device may explicitly or implicitly notify the terminal whether the configuration information of the first multicast service used in the connected state may continue to be used in the idle state/inactive state. Optionally, the network side device may further send first effective range information to the terminal. The first effective range information is used to indicate an effective range corresponding to third configuration information. The third configuration information is the configuration information of the first multicast service used by the terminal in the non-connected state. That is, the network side device may send, to the terminal, the effective range information that can be used for the configuration information of the first multicast service used in the non-connected state.

C12: Third RRC signaling.

The third RRC signaling is used to carry second configuration information or an obtaining manner of the second configuration information, and the second configuration information is configuration information of the first multicast service used by the terminal in the non-connected state.

It should be noted that the third RRC signaling may be dedicated RRC signaling.

It should be noted that, the third RRC signaling being used to carry the configuration information of the first multicast service that can be used in the non-connected state refers to the following: When or before releasing the terminal, the network side device notifies, by using the dedicated RRC signaling, the terminal of a new set of configuration information for receiving the multicast service in the idle state/inactive state. Optionally, the network side device may further send first effective range information to the terminal. The first effective range information is used to indicate an effective range corresponding to third configuration information. The third configuration information is the configuration information of the first multicast service used by the terminal in the non-connected state. That is, the network side device may send, to the terminal, the effective range information that can be used for the configuration information of the first multicast service used in the non-connected state.

It should be noted that, the third RRC signaling being used to carry the obtaining manner of the configuration information of the first multicast service refers to the following: When or before releasing the terminal, the network side device notifies, by using the dedicated RRC signaling, the terminal of a manner of reobtaining the configuration information of the multicast service in the idle/inactive state. For example, configuration information of a multicast service in an MCCH is used. In this way, after returning to the idle state/inactive state, the terminal obtains the configuration information by reading the MCCH, and then receives the service.

It should be noted that the effective range information mentioned above is used to indicate at least one of the following:

C21: The configuration information is effective in a cell in which the notification information is sent.

That is, in this case, the configuration information is effective only in a current cell, or a default value is effective only in a current cell. In other words, the configuration information carries no effective range information, meaning that the configuration information is effective only in the current cell.

C22: Information about a cell in which the configuration information takes effect.

For example, the information about the cell may be a cell list.

That is, in this case, when moving between all cells indicated by the cell list, the terminal may directly use the configuration information of the multicast service to receive data.

C23: Information about a tracking area (TA) in which the configuration information takes effect.

For example, the TA information may be a TA list.

That is, in this case, when moving between all cells indicated by the TA list, the terminal may directly use the configuration information of the multicast service to receive data.

It should be noted that, if the terminal moves out of the effective range of the foregoing configuration information, for example, the terminal moves out of the current cell, or moves out of a range of the cell list or the TA list, the terminal needs to reobtain the configuration information of the multicast service before the terminal can continue to receive the service. An obtaining manner is reading the MCCH and entering the connected state to request from a network, or establishing a unicast protocol data unit (PDU) session (unicast PDU session) in a cell that does not support a multicast broadcast service (MBS) to receive a service in a unicast manner.

It should be noted that, in this case, if the configuration is reobtained in the idle state/inactive state through the MCCH, an area information management manner of the MCCH in a related technology is used. Details are not be described herein again.

Further, it should be noted that, for the foregoing two cases that are A11 and A12, when needing to change the configuration information of the multicast service between activation and deactivation of the multicast service, the network side device may send a service configuration information change notification to the terminal. For example, in an MCCH change notification process, a change bit is carried by using an MCCH notification, or a dedicated multicast change bit is used to notify the terminal that a configuration of a multicast service is changed. In this case, the terminal re-reads the MCCH to obtain configuration information after the change, thereby continuing to receive a service. Generally, the MCCH change notification is sent through the MCCH in a previous modification cycle, and MCCH content is actually changed in a next modification cycle.

When the multicast service needs to be deactivated, the network side device sends a service ending indication to the terminal in a second manner.

The second manner includes one of the following:

D11: Carry the service ending indication by using a target bit in the MCCH change notification.

It should be noted that, the target bit includes one of the following: a stop bit, a multicast stop bit, a change bit, a multicast change bit.

Because deactivation is also a special change, after reading the notification, the terminal re-reads the MCCH in the next modification cycle and finds that the multicast service of interest is no longer in an MCCH list, that is, learns that the service is ended/deactivated, and may stop receiving the service.

D12: Carry the service ending indication by using user plane (UP) signaling.

The UP signaling refers to control signaling of a data plane, and generally, may be a Layer 2 (L2) control protocol data unit (PDU) (in other words, L2 control PDU), such as a packet data convergence protocol (PDCP)/radio link control (RLC) PDU or a media access control control element (MAC CE). An ending indication and a corresponding identifier are carried in the UP signaling. In this case, after receiving the UP signaling, the terminal learns that the service is ended/deactivated and may stop receiving the service. An advantage of UP signaling notification is that the control PDU may be sent immediately at an end position without waiting for the next modification cycle.

It should be further noted that, in such a manner of obtaining the multicast configuration information by using the dedicated RRC signaling and using the multicast configuration information in the idle state/inactive state, if the configuration information needs to be changed in a time interval between service activation and deactivation, the terminal needs to return to the connected state to obtain a new configuration by using the dedicated RRC signaling. All terminals interested in the service may be woken up in a paging message notification manner to re-enter the connected state, and are released to the idle state/inactive state after obtaining the new configuration, to continue to receive a service. If the service is ended/deactivated, it is inappropriate to wake up the terminal through paging to return to the connected state. It is a relatively efficient way to directly notify, by using the UP control PDU/control element, the terminal that the service is ended/deactivated. After receiving the notification, the terminal learns that the service is ended, and directly stops receiving the service.

It should be noted that this embodiment of this application provides the two manners of obtaining the configuration information of the multicast service, in other words, performing obtaining through the common control channel and performing obtaining by using the dedicated RRC signaling and the effective range. In actual use, mixed/selective use is not excluded, and the following is implemented based on a network and determined based on an algorithm:

E11: For some services, configuration information of the multicast service is obtained through the common control channel, and for other services, configuration information of the multicast service is obtained by using the dedicated signaling and the effective range.

E12: For a same service, some terminals obtain configuration information of the multicast service through the common control channel, and other terminals obtain configuration information of the multicast service by using the dedicated signaling and the effective range.

E13: For a service that only support reception in the inactive state, configuration information of the multicast service is obtained by using the dedicated signaling and the effective range. However, for a service that also needs to be received by the terminal supporting the idle state, configuration information of the multicast service is obtained through the common control channel.

E14: When higher efficiency is pursued, configuration information of the multicast service is obtained through the common control channel. For other temporary releasing cases, configuration information of the multicast service is obtained by using the dedicated signaling and the effective range.

It should be noted that, in this embodiment of this application, in a manner in which the terminal in the idle state and the inactive state can receive the multicast service, the network side device may flexibly control the state in which the terminal performs receiving based on a need, so that the network side device can more flexibly increase overall system efficiency on the basis of taking into account an effect of receiving the multicast service by the terminal.

It should be noted that an execution subject of the method for receiving and configuring a multicast service provided in this embodiment of this application may be an apparatus for receiving and configuring a multicast service, or a control module that is in the apparatus for receiving and configuring a multicast service and that is configured to execute the method for receiving and configuring a multicast service. In this embodiment of this application, an example in which the method for receiving and configuring a multicast service is implemented by the apparatus for receiving and configuring a multicast service is used to describe the apparatus for receiving and configuring a multicast service provided in this embodiment of this application.

In the embodiments of this application, based on the notification information indicating that the terminal remains in the current state to receive the first multicast service, and/or that the terminal is released from the connected state to the non-connected state to receive the first multicast service, the terminal can be enabled to receive a multicast service in an appropriate state, thereby avoiding as much as possible that system load is excessively heavy or a system is even overloaded, and increasing network efficiency and improving overall performance.

As shown in FIG. 3, an embodiment of this application provides an apparatus 300 for receiving and configuring a multicast service, including:

a first sending module 301, configured to send notification information to a terminal, where the notification information is used to indicate one of the following:

the terminal remains in a current state to receive a first multicast service; and the terminal is released from a connected state to a non-connected state to receive the first multicast service.

Optionally, the first sending module 301 is configured to:

when the terminal does not need to enter the connected state to receive the first multicast service, send the notification information to the terminal.

Optionally, when the notification information is used to indicate that the terminal remains in the current state to receive the first multicast service, the first sending module 301 is configured to:

send target information to the terminal, where the target information carries the notification information, where the target information includes at least one of the following:

a paging message, a multicast control channel MCCH change notification, and first radio resource control RRC signaling.

Optionally, the target information further includes a first multicast service activation notification, and the first multicast service activation notification is used to indicate that the first multicast service is to be activated.

Optionally, the apparatus further includes:

a second sending module, configured to send configuration information of the first multicast service to the terminal through a multicast control channel and a common control channel.

Optionally, the second sending module includes:

a first obtaining unit, configured to determine whether the terminal has a capability to receive the common control channel at a preset frequency; and a first sending unit, configured to: when the terminal has the capability to receive the common control channel at the preset frequency, send the configuration information of the first multicast service to the terminal through the common control channel.

Optionally, after the first obtaining unit determines whether the terminal has the capability to receive the common control channel at the preset frequency, the apparatus 300 further includes:

a second sending unit, configured to: when the terminal has no capability to receive the common control channel at the preset frequency, send the configuration information of the first multicast service to the terminal by using second RRC signaling.

Optionally, the capability to receive the common control channel includes one of the following:

a capability to receive a common control channel in a primary cell or a primary secondary cell;

a capability to receive a common control channel in any serving cell; and a capability to receive a common control channel in any cell that can be configured as a serving cell.

Optionally, when the notification information is used to indicate that the terminal is released from the connected state to the non-connected state to receive the first multicast service, the apparatus further includes:

a first indication module, configured to indicate, in a first manner for the terminal, the configuration information of the first multicast service used in the non-connected state.

The first manner includes one of the following:

a first indication sent when the network side device releases the terminal, where the first indication is used to indicate availability that is of first configuration information and that exists when the terminal is in the non-connected state, and the first configuration information is configuration information used when the terminal performs the first multicast service in the connected state; and third RRC signaling, where the third RRC signaling is used to carry second configuration information or an obtaining manner of the second configuration information, and the second configuration information is configuration information of the first multicast service used by the terminal in the non-connected state.

Optionally, when the first manner is the first indication sent when the network side device releases the terminal or third RRC signaling used to carry the second configuration information, the apparatus further includes:

a third sending module, configured to send first effective range information to the terminal by the network side device, where the first effective range information is used to indicate an effective range corresponding to third configuration information, and the third configuration information is configuration information of the first multicast service used by the terminal in the non-connected state.

Optionally, the effective range information is used to indicate at least one of the following:

the configuration information being effective in a cell in which the notification information is sent;

information about a cell in which the configuration information takes effect; and information about a tracking area in which the configuration information takes effect.

Optionally, when the notification information is used to indicate that the terminal is released from the connected state to the non-connected state to receive the first multicast service, the first sending module 301 is configured to:

send fourth RRC signaling to the terminal, where the fourth RRC signaling carries the notification information.

Optionally, the apparatus further includes:

a fourth sending module, configured to send service configuration information change notification to the terminal.

Optionally, the apparatus further includes:

a fourth sending module, configured to send a service ending indication to the terminal in a second manner.

The second manner includes one of the following:

carrying the service ending indication by using a target bit in the MCCH change notification, where the target bit includes one of the following: a stop bit, a multicast stop bit, a change bit, and a multicast change bit; and carrying the service ending indication by using user plane UP signaling.

Preferably, an embodiment of this application further provides a network side device, including a processor, a memory, and a program or an instruction stored in the memory and capable of running on the processor. When the program or the instruction is executed by the processor, the processes of the foregoing embodiment of the method, for receiving and configuring a multicast service, applied to the network side device are implemented and a same technical effect can be achieved. To avoid repetition, details are not described herein again.

An embodiment of this application further provides a readable storage medium, where the computer readable storage medium stores a program or an instruction, and when the program or the instruction is executed by a processor, the processes of the embodiment of the method, for receiving and configuring a multicast service, applied to a network side device are implemented, and a same technical effect can be achieved. To avoid repetition, details are not described herein again.

The computer-readable storage medium includes a read-only memory (ROM), a random access memory (RAM), a magnetic disk, an optical disc, or the like.

An embodiment of this application further provides a network side device, including a processor and a communication interface. The communication interface is configured to send notification information to a terminal.

The notification information is used to indicate one of the following:

- the terminal remains in a current state to receive a first multicast service; and
- the terminal is released from a connected state to a non-connected state to receive the first multicast service.

The embodiment of the network side device corresponds to the foregoing method embodiment of the network side device. Each implementation process and implementation of the foregoing method embodiment may be applicable to the embodiment of the network side device, and a same technical effect can be achieved.

Specifically, an embodiment of this application further provides a network side device. As shown in FIG. 4, a network side device 400 includes an antenna 401, a radio frequency apparatus 402, and a baseband apparatus 403. The antenna 401 is connected to the radio frequency apparatus 402. In an uplink direction, the radio frequency apparatus 402 receives information by using the antenna 401, and sends the received information to the baseband apparatus 403 for processing. In a downlink direction, the baseband apparatus 403 processes information that needs to be sent, and sends processed information to the radio frequency apparatus 402. The radio frequency apparatus 402 processes the received information, and sends processed information by using the antenna 401.

The frequency band processing apparatus may be located in the baseband apparatus 403. The method performed by the network side device in the foregoing embodiment may be implemented in the baseband apparatus 403. The baseband apparatus 403 includes a processor 404 and a memory 45.

The baseband apparatus 403 may include, for example, at least one baseband board. A plurality of chips are disposed on the baseband board. As shown in FIG. 4, one chip is, for example, the processor 404, which is connected to the memory 405, to invoke a program in the memory 405 to perform operations of the network side device shown in the foregoing method embodiment.

The baseband apparatus 403 may further include a network interface 406, configured to exchange information with the radio frequency apparatus 402. The interface is, for example, a common public radio interface (CPRI).

Specifically, the network side device in this embodiment of the present invention further includes an instruction or a program that is stored in the memory 405 and capable of running on the processor 404. The processor 404 invokes the instruction or the program in the memory 405 to perform the method performed by the modules shown in FIG. 3, and a same technical effect is achieved. To avoid repetition, details are not described herein again.

Figures 5, 6:
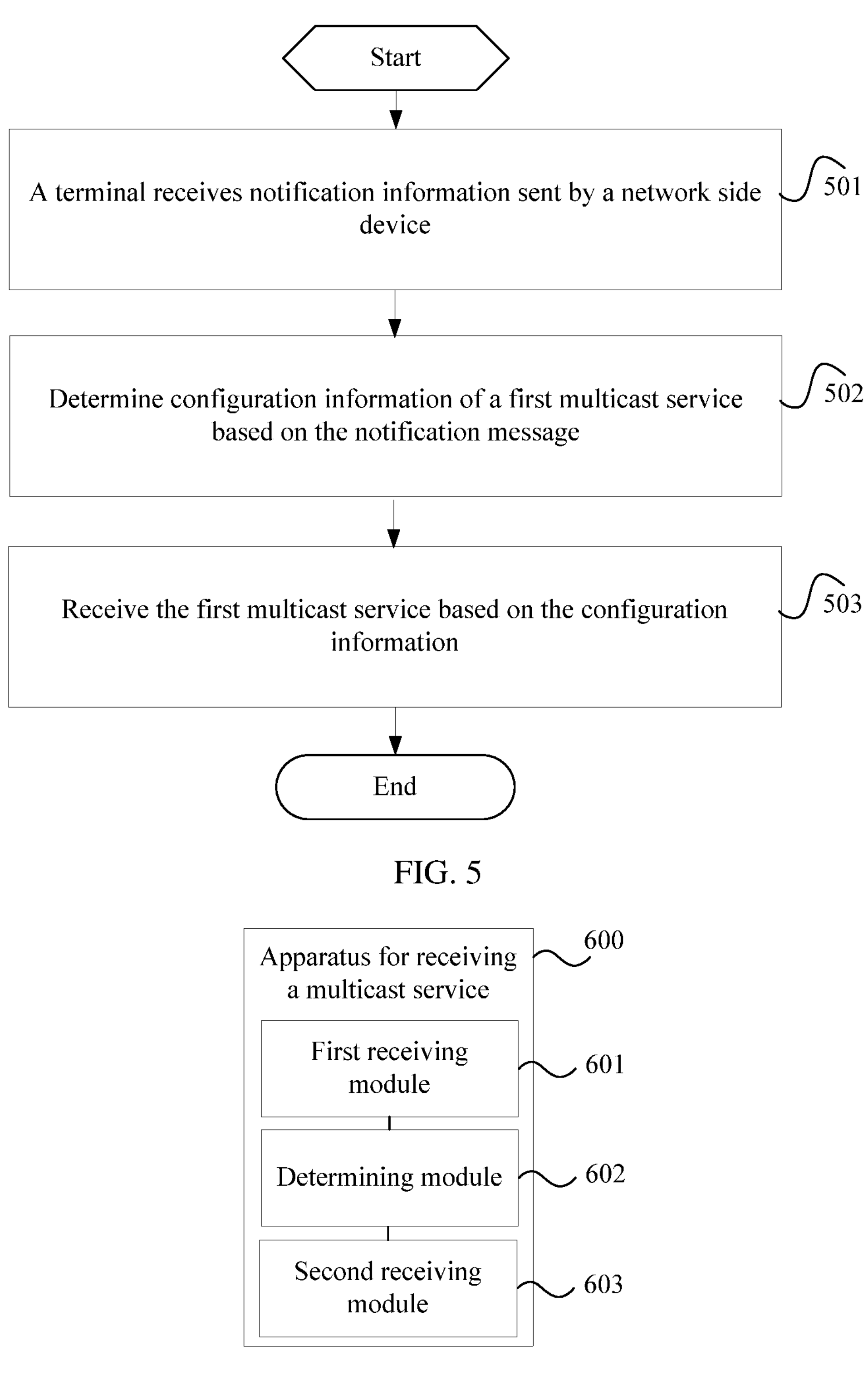
FIG. 5 is a schematic flowchart of a method for receiving a multicast service according to an embodiment of this application.
FIG. 6 is a schematic module diagram of an apparatus for receiving a multicast service according to an embodiment of this application.

As shown in FIG. 5, an embodiment of this application further provides a method for receiving a multicast service, including the following steps.

- Step 501: A terminal receives notification information sent by a network side device.
- Step 502: Determine configuration information of a first multicast service based on the notification information.
- Step 503: Receive the first multicast service based on the configuration information.

The notification information is used to indicate one of the following:

- the terminal remains in a current state to receive the first multicast service; and
- the terminal is released from a connected state to a non-connected state to receive the first multicast service.

Optionally, when the notification information is used to indicate that the terminal remains in the current state to receive the first multicast service, the receiving, by a terminal, notification information sent by a network side device includes:

- receiving target information sent by the network side device, where the target information carries the notification information, where
- the target information includes at least one of the following:
- a paging message, a multicast control channel MCCH change notification, and first radio resource control RRC signaling.

Optionally, the target information further includes a first multicast service activation notification, where the first multicast service activation notification is used to indicate that the first multicast service is to be activated.

Optionally, the determining configuration information of a first multicast service includes:

- obtaining the configuration information of the first multicast service by reading a first common control channel, where
- the first common control channel is a common control channel corresponding to a data packet or information read by the terminal at a moment that is after and closest to a moment at which the notification information is received.

Optionally, the obtaining the configuration information of the first multicast service by reading a first common control channel includes:

- determining whether the terminal has a capability to receive a common control channel at a preset frequency; and
- when the terminal has the capability to receive the common control channel at the preset frequency, obtaining the configuration information of the first multicast service by reading the first common control channel.

Optionally, after the determining whether the terminal has a capability to receive a common control channel at a preset frequency, the method further includes:

- when the terminal has no capability to receive the common control channel at the preset frequency, obtaining the configuration information of the first multicast service by using second RRC signaling.

Optionally, the capability to receive the common control channel includes one of the following:

- a capability to receive a common control channel in a primary cell or a primary secondary cell;

a capability to receive a common control channel in any serving cell; and a capability to receive a common control channel in any cell that can be configured as a serving cell.

Optionally, when the notification information is used to indicate that the terminal is released from the connected state to the non-connected state to receive the first multicast service, the method further includes:

receiving the configuration information, indicated by the network side device in the first manner, of the first multicast service used by the terminal in the non-connected state, where the first manner includes one of the following:

a first indication sent when the network side device releases the terminal, where the first indication is used to indicate availability that is of first configuration information and that exists when the terminal is in the non-connected state, and the first configuration information is configuration information used when the terminal performs the first multicast service in the connected state; and third RRC signaling, where the third RRC signaling is used to carry second configuration information or an obtaining manner of the second configuration information, and the second configuration information is configuration information of the first multicast service used by the terminal in the non-connected state.

Optionally, when the first manner is the first indication sent when the network side device releases the terminal or third RRC signaling used to carry the second configuration information, the method further includes:

receiving first effective range information sent by the network side device, where the first effective range information is used to indicate an effective range corresponding to third configuration information, and the third configuration information is configuration information of the first multicast service used by the terminal in the non-connected state.

Optionally, the effective range information is used to indicate at least one of the following:

the configuration information being effective in a cell in which the notification information is sent;

information about a cell in which the configuration information takes effect; and information about a tracking area in which the configuration information takes effect.

Optionally, when the notification information is used to indicate that the terminal is released from the connected state to the non-connected state to receive the first multicast service, the receiving, by a terminal, notification information sent by a network side device includes:

receiving, by the terminal, fourth RRC signaling sent by the network side device, where the fourth RRC signaling carries the notification information.

Optionally, the method further includes:

receiving a service configuration information change notification sent by the network side device.

Optionally, the method further includes:

receiving a service ending indication sent by the network side device in a second manner, where the second manner includes one of the following:

carrying the service ending indication by using a target bit in the MCCH change notification, where the target bit includes one of the following: a stop bit, a multicast stop bit, a change bit, and a multicast change bit; and carrying the service ending indication by using user plane UP signaling.

It should be noted that all descriptions of a terminal side in the foregoing embodiments are applicable to this embodiment, and technical effects same as those of the foregoing embodiments can be achieved. Details are not described herein again.

As shown in FIG. 6, an embodiment of this application further provides an apparatus 600 for receiving a multicast service, including:

a first receiving module 601, configured to receive notification information sent by a network side device;

a determining module 602, configured to determine configuration information of a first multicast service based on the notification information; and a second receiving module 603, configured to receive the first multicast service based on the configuration information, where the notification information is used to indicate one of the following:

a terminal remains in a current state to receive the first multicast service; and the terminal is released from a connected state to a non-connected state to receive the first multicast service.

Optionally, when the notification information is used to indicate that the terminal remains in the current state to receive the first multicast service, the first receiving module 601 is configured to:

receive target information sent by the network side device, where the target information carries the notification information, where the target information includes at least one of the following:

a paging message, a multicast control channel MCCH change notification, and first radio resource control RRC signaling.

Optionally, the target information further includes a first multicast service activation notification, where the first multicast service activation notification is used to indicate that the first multicast service is to be activated.

Optionally, the determining module 602 is configured to:

obtain the configuration information of the first multicast service by reading a first common control channel, where the first common control channel is a common control channel corresponding to a data packet or information read by the terminal at a moment that is after and closest to a moment at which the notification information is received.

Optionally, the determining module 602 includes:

a first determining unit, configured to determine whether the terminal has a capability to receive a common control channel at a preset frequency; and a second obtaining unit, configured to: when the terminal has the capability to receive the common control channel at the preset frequency, obtain the configuration information of the first multicast service by reading the first common control channel.

Optionally, after the first determining unit determines whether the terminal has the capability to receive the common control channel at the preset frequency, the apparatus further includes:

a third obtaining unit, configured to: when the terminal has no capability to receive the common control channel at the preset frequency, obtain the configuration information of the first multicast service by using second RRC signaling.

Optionally, the capability to receive the common control channel includes one of the following:

a capability to receive a common control channel in a primary cell or a primary secondary cell;

a capability to receive a common control channel in any serving cell; and a capability to receive a common control channel in any cell that can be configured as a serving cell.

Optionally, when the notification information is used to indicate that the terminal is released from the connected state to the non-connected state to receive the first multicast service, the apparatus further includes:

a third receiving module, configured to receive the configuration information, indicated by the network side device in a first manner, of the first multicast service used by the terminal in the non-connected state, where the first manner includes one of the following:

a first indication sent when the network side device releases the terminal, where the first indication is used to indicate availability that is of first configuration information and that exists when the terminal is in the non-connected state, and the first configuration information is configuration information used when the terminal performs the first multicast service in the connected state; and third RRC signaling, where the third RRC signaling is used to carry second configuration information or an obtaining manner of the second configuration information, and the second configuration information is configuration information of the first multicast service used by the terminal in the non-connected state.

Optionally, when the first manner is the first indication sent when the network side device releases the terminal or third RRC signaling used to carry the second configuration information, the apparatus further includes:

a fourth receiving module, configured to receive first effective range information sent by the network side device, where the first effective range information is used to indicate an effective range corresponding to third configuration information, and the third configuration information is configuration information of the first multicast service used by the terminal in the non-connected state.

Optionally, the effective range information is used to indicate at least one of the following:

the configuration information being effective in a cell in which the notification information is sent;

information about a cell in which the configuration information takes effect; and information about a tracking area in which the configuration information takes effect.

Optionally, when the notification information is used to indicate that the terminal is released from the connected state to the non-connected state to receive the first multicast service, the first receiving module 601 is configured to:

receive fourth RRC signaling sent by the network side device, where the fourth RRC signaling carries the notification information.

Optionally, the apparatus further includes:

a fifth receiving module, configured to receive a service configuration information change notification sent by the network side device.

Optionally, the apparatus further includes:

a sixth receiving module, configured to receive a service ending indication sent by the network side device in a second manner, where the second manner includes one of the following:

carrying the service ending indication by using a target bit in the MCCH change notification, where the target bit includes one of the following: a stop bit, a multicast stop bit, a change bit, and a multicast change bit; and carrying the service ending indication by using user plane UP signaling.

The apparatus for receiving a multicast service in this embodiment of this application may be an apparatus or an apparatus or electronic device with an operating system, or may be a component, an integrated circuit, or a chip in the terminal. The apparatus or electronic device may be a mobile terminal, or a non-mobile terminal. For example, the mobile terminal may include, but is not limited to, the types of the foregoing listed terminal 11, and the non-mobile terminal may be a server, a network attached storage (NAS), a personal computer (PC), a television (TV), an automated teller machine, or a self-service machine. This is not specifically limited in this embodiment of this application.

The apparatus for receiving a multicast service provided in this embodiment of this application can implement the processes implemented in the method embodiment in FIG. 5, and a same technical effect is achieved. To avoid repetition, details are not described herein again.

An embodiment of this application further provides a terminal, including a processor and a communication interface. The communication interface is configured to receive notification information sent by a network side device. The processor is configured to determine configuration information of a first multicast service based on the notification information. The communication interface is configured to receive the first multicast service based on the configuration information.

The notification information is used to indicate one of the following:

the terminal remains in a current state to receive the first multicast service; and the terminal is released from a connected state to a non-connected state to receive the first multicast service.

Figure 7:
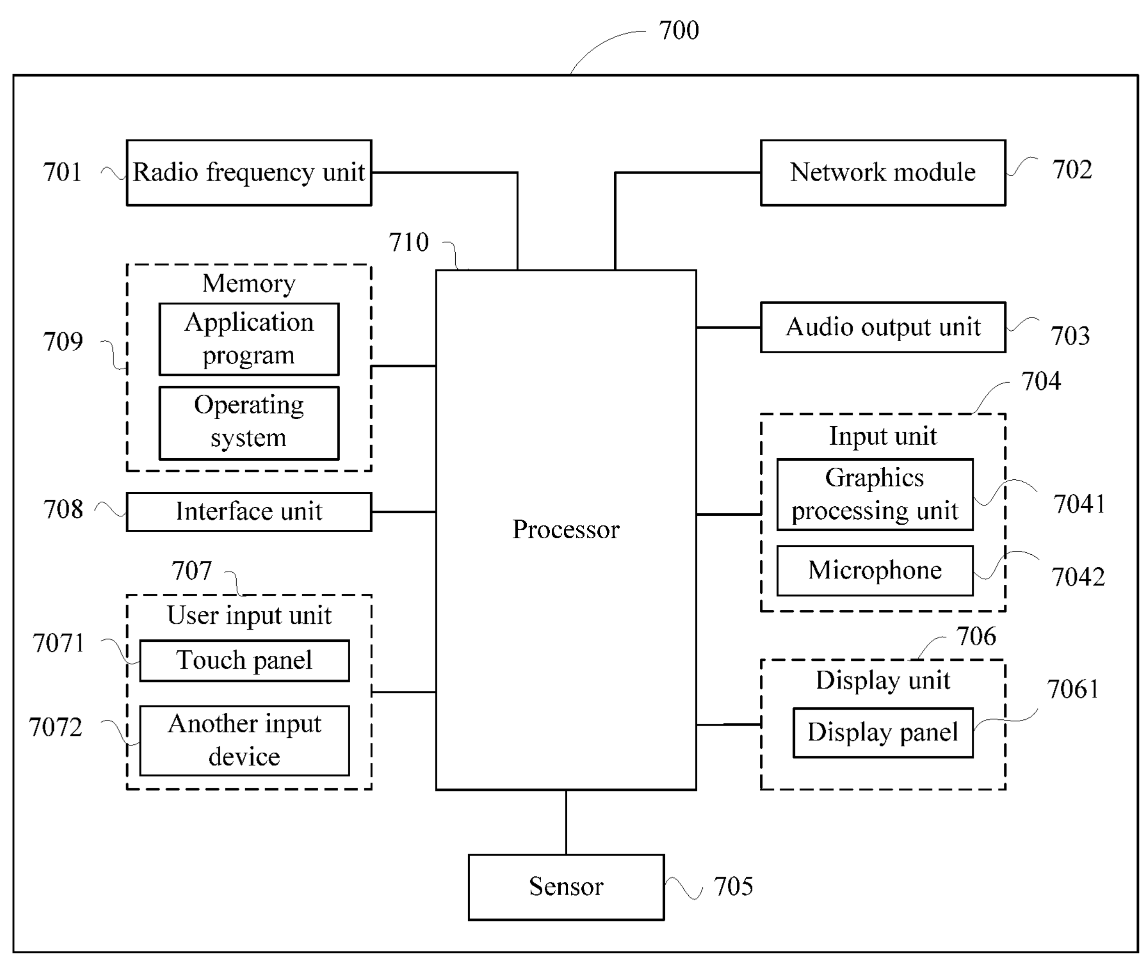
FIG. 7 is a structural block diagram of a terminal according to an embodiment of this application.

The embodiment of the terminal corresponds to the foregoing method embodiment on a terminal side. Each implementation process and implementation of the foregoing method embodiment may be applicable to the embodiment of the terminal, and a same technical effect can be achieved. Specifically, FIG. 7 is a schematic diagram of a hardware structure of a terminal according to an embodiment of this application.

A terminal 700 includes, but is not limited to, at least a part of components such as a radio frequency unit 701, a network module 702, an audio output unit 703, an input unit 704, a sensor 705, a display unit 706, a user input unit 707, an interface unit 708, a memory 709, and a processor 710.

A person skilled in the art can understand that the terminal 700 may further include a power supply (such as a battery) that supplies power to each component. The power supply may be logically connected to the processor 710 by using a power supply management system, to implement functions such as charging and discharging management, and power consumption management by using the power supply management system. The terminal structure shown in FIG. 7 constitutes no limitation on the terminal, and the terminal may include more or fewer components than those shown in the figure, or combine some components, or have different component arrangements. Details are not described herein.

It should be understood that, in this embodiment of this application, the input unit 704 may include a graphics processing unit (GPU) 7041 and a microphone 7042, and the graphics processing unit 7041 processes image data of a still picture or a video obtained by an image capture apparatus (such as a camera) in a video capture mode or an image capture mode. The display unit 706 may include a display panel 7061. Optionally, the display panel 7061 may be configured in a form such as a liquid crystal display or an organic light-emitting diode. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include, but is not limited to, a physical keyboard, a functional button (such as a volume control button or a power on/off button), a trackball, a mouse, and a joystick. Details are not described herein.

In this embodiment of this application, the radio frequency unit 701 receives downlink data from a network side device and then sends the downlink data to the processor 710 for processing; and sends uplink data to the network side device. Usually, the radio frequency unit 701 includes, but is not limited to, an antenna, at least one amplifier, a transceiver, a coupler, a low noise amplifier, a duplexer, and the like.

The memory 709 may be configured to store a software program or an instruction and various data. The memory 709 may mainly include a program or instruction storage area and a data storage area. The program or instruction storage area may store an operating system, and an application or an instruction required by at least one function (for example, a sound playing function or an image playing function). In addition, the memory 709 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another non-volatile solid-state storage device.

The processor 710 may include one or more processing units. Optionally, an application processor and a modem processor may be integrated into the processor 710. The application processor mainly processes an operating system, a user interface, an application, an instruction, or the like. The modem processor mainly processes wireless communication, for example, a baseband processor. It can be understood that, alternatively, the modem processor may not be integrated into the processor 710.

The radio frequency unit 701 is configured to receive notification information sent by a network side device.

The processor 710 is configured to determine configuration information of a first multicast service based on the notification information.

The radio frequency unit 701 is configured to receive the first multicast service based on the configuration information, where the notification information is used to indicate one of the following:

the terminal remains in a current state to receive the first multicast service; and the terminal is released from a connected state to a non-connected state to receive the first multicast service.

Optionally, when the notification information is used to indicate that the terminal remains in the current state to receive the first multicast service, the radio frequency unit 701 is configured to:

receive target information sent by the network side device, where the target information carries the notification information, where the target information includes at least one of the following:

a paging message, a multicast control channel MCCH change notification, and first radio resource control RRC signaling.

Optionally, the target information further includes: a first multicast service activation notification.

Optionally, the processor 710 is configured to:

obtain the configuration information of the first multicast service by reading a first common control channel, where the first common control channel is a common control channel corresponding to a data packet or information read by the terminal at a moment that is after and closest to a moment at which the notification information is received.

Optionally, the processor 710 is configured to:

determine whether the terminal has a capability to receive a common control channel at a preset frequency; and when the terminal has the capability to receive the common control channel at the preset frequency, obtain the configuration information of the first multicast service by reading the first common control channel.

Optionally, after the processor 710 determines whether the terminal has the capability to receive the common control channel at the preset frequency, the processor 710 is further configured to:

when the terminal has no capability to receive the common control channel at the preset frequency, obtain the configuration information of the first multicast service by using second RRC signaling.

Optionally, the capability to receive the common control channel includes one of the following:

a capability to receive a common control channel in a primary cell or a primary secondary cell;

a capability to receive a common control channel in any serving cell; and a capability to receive a common control channel in any cell that can be configured as a serving cell.

Optionally, when the notification information is used to indicate that the terminal is released from a connected state to a non-connected state to receive the first multicast service, the radio frequency unit 701 is further configured to:

receive the configuration information, indicated by the network side device in a first manner, of the first multicast service used by the terminal in the non-connected state, where the first manner includes one of the following:

a first indication sent when the network side device releases the terminal, where the first indication is used to indicate availability that is of first configuration information and that exists when the terminal is in the non-connected state, and the first configuration information is configuration information used when the terminal performs the first multicast service in the connected state; and third RRC signaling, where the third RRC signaling is used to carry second configuration information or an obtaining manner of the second configuration information, and the second configuration information is configuration information of the first multicast service used by the terminal in the non-connected state.

Optionally, when the first manner is the first indication sent when the network side device releases the terminal or third RRC signaling used to carry the second configuration information, the radio frequency unit 701 is further configured to:

receive first effective range information sent by the network side device, where the first effective range information is used to indicate an effective range corresponding to third configuration information, and the third configuration information is configuration information of the first multicast service used by the terminal in the non-connected state.

Optionally, the effective range information is used to indicate at least one of the following:

the configuration information being effective in a cell in which the notification information is sent;

information about a cell in which the configuration information takes effect; and information about a tracking area in which the configuration information takes effect.

Optionally, when the notification information is used to indicate that the terminal is released from the connected state to the non-connected state to receive the first multicast service, the radio frequency unit 701 is configured to:

receive fourth RRC signaling sent by the network side device, where the fourth RRC signaling carries the notification information.

Optionally, the radio frequency unit 701 is further configured to:

receive a service configuration information change notification sent by the network side device.

Optionally, the radio frequency unit 701 is further configured to:

receive a service ending indication sent by the network side device in a second manner, where the second manner includes one of the following:

carrying the service ending indication by using a target bit in the MCCH change notification, where the target bit includes one of the following: a stop bit, a multicast stop bit, a change bit, and a multicast change bit; and carrying the service ending indication by using user plane UP signaling.

Preferably, an embodiment of this application further provides a terminal, including a processor, a memory, and a program or an instruction stored in the memory and capable of running on the processor. When the program or the instruction is executed by the processor, the processes of the embodiment of the method for receiving a multicast service are implemented, and a same technical effect can be achieved. To avoid repetition, details are not described herein again.

An embodiment of this application further provides a readable storage medium. The readable storage medium stores a program or an instruction. The readable storage medium may be volatile or non-volatile. When the program or the instruction is executed by a processor, the processes of the embodiment of the method for receiving a multicast service are implemented, and a same technical effect can be achieved. To avoid repetition, details are not described herein again. The computer-readable storage medium includes a read-only memory (ROM), a random access memory (RAM), a magnetic disk, an optical disc, or the like.

Figure 8:
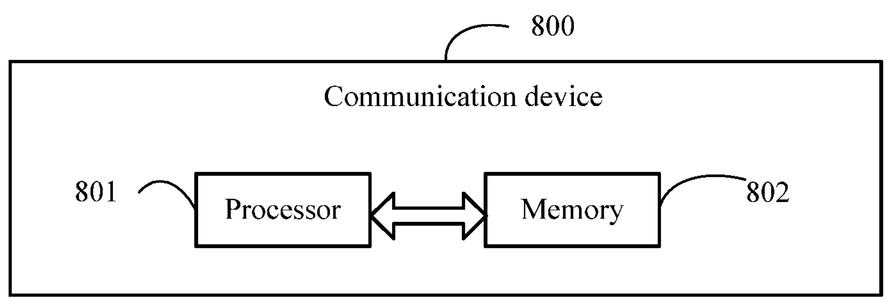
FIG. 8 is a structural block diagram of a communication device according to an embodiment of this application.

Optionally, as shown in FIG. 8, an embodiment of this application further provides a communication device 800, including a processor 801, a memory 802, and a program or an instruction stored in the memory 802 and capable of running on the processor 801. For example, when the communication device 800 is a terminal, the program or the instruction is executed by the processor 801 to implement the processes of the embodiment of the method for receiving a multicast service, and a same technical effect can be achieved. When the communication device 800 is a network side device, the program or the instruction is executed by the processor 801 to implement the processes of the embodiment of the method for receiving and configuring a multicast service, and a same technical effect can be achieved. To avoid repetition, details are not described herein again.

The terminal used in the embodiments of this application may be a device that provides a user with voice and/or data connectivity, a handheld device that has a wireless connection function, another processing device connected to a wireless modem, or the like. In different systems, the terminal device may have different names. For example, in a 5G system, the terminal device may be referred to as user equipment (UE). The wireless terminal device may communicate with one or more core networks (CN) through a radio access network (RAN). The wireless terminal device may be a mobile terminal device, such as a mobile phone (or referred to as a "cellular" phone) and a computer with a mobile terminal device, and may be, for example, a portable, pocket-sized, handheld, computer built-in, or vehicle-mounted mobile apparatus, which exchange language and/or data with a radio access network. For example, the wireless terminal device is a device such as a personal communication service (PCS) telephone, a cordless telephone, a session initiation protocol (SIP) phone, a wireless local loop (WLL) station, or a personal digital assistant (PDA). The wireless terminal device may also be referred to as a system, a subscriber unit, a subscriber station, a mobile station, a mobile, a remote station, an access point, a remote terminal device (remote terminal), an access terminal device (access terminal), a user terminal device (user terminal), a user agent, a user device. This is not limited in this embodiment of this application.

The network side device used in the embodiments of this application may be a base transceiver station (BTS) in a global system for mobile communications (GSM) or code division multiple access (CDMA), or may be a NodeB (NB) in wideband code division multiple access (WCDMA), or may be an evolved NodeB (eNB or eNodeB), a relay station, or an access point in LTE, or a base station in a future 5G network, or the like. This is not limited herein.

The network side device and the terminal may each use one or more antennas for Multi-Input Multi-Output (MIMO) transmission. The MIMO transmission may be single user MIMO (SU-MIMO) or multiple user MIMO (MU-MIMO). Based on shapes and a quantity of root antenna combinations, the MIMO transmission may be 2D-MIMO, 3D-MIMO, FD-MIMO, or massive-MIMO, or may be diversity transmission, precoding transmission, beamforming transmission, or the like.

An embodiment of this application further provides a chip. The chip includes a processor and a communications interface. The communications interface is coupled to the processor. The processor is configured to run a program or an instruction to implement the processes of the embodiment of the method for receiving and configuring a multicast service or the method for receiving a multicast service, and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a computer program product. The computer program product is stored in a non-transient storage medium. The computer program product is executed by at least one processor to implement the processes of the embodiment of the method for receiving and configuring a multicast service or the method for receiving a multicast service, and a same technical effect can be achieved. To avoid repetition, details are not described herein again.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such understanding, the technical solutions of this application essentially, or the part contributing to the related technology may be implemented in a form of a software product. The computer software product is stored in a storage medium (such as a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A method for receiving and configuring a multicast service, comprising:

sending, by a network side device, notification information to a terminal, wherein the notification information is used to indicate:

the terminal is released from a connected state to a non-connected state to receive a first multicast service, wherein the method further comprises:

indicating, in a first manner for the terminal, configuration information of the first multicast service used in the non-connected state, wherein the first manner comprises third RRC signaling, wherein the third RRC signaling is used to carry second configuration information or an obtaining manner of the second configuration information, and the second configuration information is configuration information of the first multicast service used by the terminal in the non-connected state.

2. The method according to claim 1, wherein sending, by the network side device, notification information to the terminal comprises:

when the terminal does not need to enter the connected state to receive the first multicast service, sending, by the network side device, the notification information to the terminal.

3. The method according to claim 1, wherein the notification information is used to indicate the terminal remains in a current state to receive a first multicast service, sending, by the network side device, notification information to the terminal comprises:

sending, by the network side device, target information to the terminal, wherein the target information carries the notification information, wherein the target information comprises at least one of the following:

a paging message, a multicast control channel (MCCH) change notification, and first radio resource control RRC signaling.

4. The method according to claim 3, wherein the target information further comprises a first multicast service activation notification, wherein the first multicast service activation notification is used to indicate that the first multicast service is to be activated.

5. The method according to claim 4, further comprising:

sending, by the network side device, configuration information of the first multicast service to the terminal through a common control channel, wherein the sending configuration information of the first multicast service to the terminal through the common control channel comprises:

determining, by the network side device, whether the terminal has a capability to receive the common control channel at a preset frequency; and when the terminal has the capability to receive the common control channel at the preset frequency, sending, by the network side device, the configuration information of the first multicast service to the terminal through a multicast control channel and the common control channel.

6. The method according to claim 5, after the determining, by the network side device, whether the terminal has a capability to receive the common control channel at a preset frequency, further comprising:

when the terminal has no capability to receive the common control channel at the preset frequency, sending, by the network side device, the configuration information of the first multicast service to the terminal by using second RRC signaling;

or, wherein the capability to receive the common control channel comprises one of the following:

a capability to receive a common control channel in a primary cell or a primary secondary cell;

a capability to receive a common control channel in any serving cell; and a capability to receive a common control channel in any cell that can be configured as a serving cell.

7. The method according to claim 1, wherein sending, by the network side device, notification information to the terminal comprises:

sending, by the network side device, fourth RRC signaling to the terminal, wherein the fourth RRC signaling carries the notification information.

8. The method according to claim 1, wherein when the first manner is the first indication sent when the network side device releases the terminal or third RRC signaling used to carry the second configuration information, the method further comprises:

sending, by the network side device, first effective range information to the terminal, wherein the first effective range information is used to indicate an effective range corresponding to third configuration information, and the third configuration information is configuration information of the first multicast service used by the terminal in the non-connected state.

9. The method according to claim 8, wherein the effective range information is used to indicate at least one of the following:

the configuration information being effective in a cell in which the notification information is sent;

information about a cell in which the configuration information takes effect; and information about a tracking area in which the configuration information takes effect.

10. The method according to claim 1, further comprising:

sending, by the network side device, a service configuration information change notification to the terminal; or, further comprising:

sending a service ending indication to the terminal in a second manner, wherein the second manner comprises one of the following:

carrying the service ending indication by using a target bit in a MCCH change notification, wherein the target bit comprises one of the following: a stop bit, a multicast stop bit, a change bit, and a multicast change bit; and carrying the service ending indication by using user plane UP signaling.

11. A method for receiving a multicast service, comprising:

receiving, by a terminal, notification information sent by a network side device;

determining configuration information of a first multicast service based on the notification information; and receiving the first multicast service based on the configuration information;

the notification information is used to indicate:

the terminal is released from a connected state to a non-connected state to receive the first multicast service, wherein the method further comprises:

receiving the configuration information, indicated by the network side device in a first manner, of the first multicast service used by the terminal in the non-connected state, wherein the first manner comprises third RRC signaling, wherein the third RRC signaling is used to carry second configuration information or an obtaining manner of the second configuration information, and the second configuration information is configuration information of the first multicast service used by the terminal in the non-connected state.

12. The method according to claim 11, wherein the notification information is used to indicate the terminal remains in a current state to receive a first multicast service, receiving, by the terminal, notification information sent by the network side device comprises:

receiving target information sent by the network side device, wherein the target information carries the notification information, wherein the target information comprises at least one of the following:

a paging message, a multicast control channel (MCCH) change notification, and first radio resource control RRC signaling.

13. The method according to claim 12, wherein the target information further comprises a first multicast service activation notification, wherein the first multicast service activation notification is used to indicate that the first multicast service is to be activated.

14. The method according to claim 13, wherein the determining configuration information of a first multicast service comprises:

obtaining the configuration information of the first multicast service by reading a first common control channel, wherein the first common control channel is a common control channel corresponding to a data packet or information read by the terminal at a moment that is after and closest to a moment at which the notification information is received.

15. The method according to claim 11, wherein when the notification information is used to indicate that the terminal is released from the connected state to the non-connected state to receive the first multicast service, receiving, by the terminal, notification information sent by the network side device comprises:

receiving, by the terminal, fourth RRC signaling sent by the network side device, wherein the fourth RRC signaling carries the notification information.

16. The method according to claim 11, when the first manner is the first indication sent when the network side device releases the terminal or third RRC signaling used to carry the second configuration information, further comprising:

receiving first effective range information sent by the network side device, wherein the first effective range information is used to indicate an effective range corresponding to third configuration information, and the third configuration information is configuration information of the first multicast service used by the terminal in the non-connected state.

17. The method according to claim 16, wherein the effective range information is used to indicate at least one of the following:

the configuration information being effective in a cell in which the notification information is sent;

information about a cell in which the configuration information takes effect; and information about a tracking area in which the configuration information takes effect.

18. The method according to claim 11, further comprising:

receiving a service configuration information change notification sent by the network side device;

or, further comprising:

receiving a service ending indication sent by the network side device in a second manner, wherein the second manner comprises one of the following:

carrying the service ending indication by using a target bit in a MCCH change notification, wherein the target bit comprises one of the following: a stop bit, a multicast stop bit, a change bit, and a multicast change bit; and carrying the service ending indication by using user plane UP signaling.

19. A network side device, comprising a processor, a memory, and a program or an instruction stored in the memory and capable of running on the processor, wherein when the program or the instruction is executed by the processor, the steps of the method for receiving and configuring a multicast service according to claim 1 are implemented.

20. A terminal, comprising a processor, a memory, and a program or an instruction stored in the memory and capable of running on the processor, wherein when the program or the instruction is executed by the processor, the following steps are implemented:

receiving notification information sent by a network side device;

determining configuration information of a first multicast service based on the notification information; and receiving the first multicast service based on the configuration information;

the notification information is used to indicate:

the terminal is released from a connected state to a non-connected state to receive the first multicast service, wherein the following steps are further implemented:

receiving the configuration information, indicated by the network side device in a first manner, of the first multicast service used by the terminal in the non-connected state, wherein the first manner comprises third RRC signaling, wherein the third RRC signaling is used to carry second configuration information or an obtaining manner of the second configuration information, and the second configuration information is configuration information of the first multicast service used by the terminal in the non-connected state.

* * * * *